(12) United States Patent
Digernes

(10) Patent No.: US 7,681,869 B2
(45) Date of Patent: Mar. 23, 2010

(54) DAMPING APPARATUS FOR THE DAMPING OF VIBRATIONS

(75) Inventor: Anders Digernes, Trondheim (NO)

(73) Assignee: Teeness ASA, Trondheim (NO)

( * ) Notice: Subject to any disclaimer, the term of this patent is extended or adjusted under 35 U.S.C. 154(b) by 100 days.

(21) Appl. No.: 10/513,349

(22) PCT Filed: Apr. 14, 2003

(86) PCT No.: PCT/NO03/00124

§ 371 (c)(1),
(2), (4) Date: Jul. 1, 2005

(87) PCT Pub. No.: WO03/093696

PCT Pub. Date: Nov. 13, 2003

(65) Prior Publication Data

US 2005/0258580 A1 Nov. 24, 2005

(30) Foreign Application Priority Data

Apr. 30, 2002 (NO) .................................. 20022077

(51) Int. Cl.
*F16M 1/00* (2006.01)
(52) U.S. Cl. ..................................................... 267/137
(58) Field of Classification Search ................. 267/137, 267/141, 125, 145; 408/143; 409/141; 82/158; *B52B 29/02; B23B 29/02*
See application file for complete search history.

(56) References Cited

U.S. PATENT DOCUMENTS

| 3,169,412 A | * | 2/1965 | Weeks ........................ 74/574.4 |
| 3,242,791 A | | 3/1966 | Smith |
| 3,486,585 A | * | 12/1969 | Hasz et al. ................... 188/379 |
| 3,559,512 A | | 2/1971 | Aggarwal |
| 3,690,414 A | * | 9/1972 | Aggarwal et al. ............ 188/378 |
| 3,838,936 A | | 10/1974 | Andreassen et al. |
| 4,385,665 A | * | 5/1983 | Knoll ....................... 173/162.1 |
| 5,413,318 A | | 5/1995 | Andreassen |
| 5,460,156 A | * | 10/1995 | Sappington ................... 124/89 |
| 6,095,922 A | | 8/2000 | Friedrichsen et al. |
| 6,443,673 B1 | * | 9/2002 | Etling et al. ................. 408/1 R |

FOREIGN PATENT DOCUMENTS

| JP | 07035196 A | * | 2/1995 |
| JP | 07035219 | | 2/1995 |
| JP | 07035219 A | * | 2/1995 |

\* cited by examiner

*Primary Examiner*—Xuan Lan Nguyen
(74) *Attorney, Agent, or Firm*—Patterson & Sheridan, L.L.P.

(57) ABSTRACT

The present invention concerns a damping apparatus for the damping of vibrations in tool holders, machine elements and work pieces in machine tools and in other objects that are exposed to unwanted vibrations. The damping apparatus is adapted to be provided in or on the object and includes a substantially cylindrically shaped damping body with a boring going there through and a longitudinal central body that is rigidly connectable to the object that is to be damped. The damping body is connected to the longitudinal central body through elastic elements. The connection is made such that the elastic elements are substantially exposed to shear forces during damping.

13 Claims, 4 Drawing Sheets

KNOWN ART

DAMPING APPARATUS FOR THE DAMPING OF VIBRATIONS

BACKGROUND OF THE INVENTION

1. Field of the Invention

The present invention concerns a damping apparatus that particularly but not exclusively is designed for boring bars and similar tool holding bars used in machine tools. Typical examples are boring bars used for chip cutting machining (turning, milling, etc.) on weak constructions, such as shafts and similar elements. The apparatus may also be used on "clampings", other parts of a machine, and works pieces. Self generating oscillations are typically a result of the dynamic rigidity of a construction being too small.

2. Description of the Related Art

Similar damping apparatuses are previously known, and a related apparatus is shown in NO patent 128 725. This patent concerns a damping device that necessarily must be placed in a boring in the boring bar, because the boring itself constitutes an important part of the damping device, in that the damping effect is a result of an interaction between the damping body and the boring itself, through resilient elements provided between the damping body and the boring.

The development evolves towards an increased ration between length/diameter (overhang) on tool holders. This results in a reduction of the dynamic rigidity of the tool holder and this again impose new requirements to the damping device that must be adapted accordingly. The problem with the damping device according to the known art is that to adapt the damping device to these new conditions, the frequency of the damping body must be lowered. To achieve this, either resilient elements with a lower spring constant, or a damping body with a larger mass is required.

The density of the damping bodies used to day is already among the highest commercially available. To increase the mass, the volume of the damping body must therefore be increased. This will result in problems related to space and size and weakening of the construction where the damping apparatus is to be placed.

To be able to reduce the spring constant with solutions according to the known art, as for instance described in NO patent 172 677, must accordingly either the material in the resilient element be changed to a softer material with a lower spring constant, or the strength of the resilient element must be reduced by reducing the size of the element. At the same time, the resilient elements must resist heat that is developed during the chip cutting process, and as a result of energy absorption in the material, in addition to being dimensioned to withstand forces they are exposed to. This has proved to be contradicting properties.

The conclusion is that the solutions according to the known art therefore not is well suited in the development towards an increased length/diameter ratio and a lower natural frequency for a system that is to be damped, due to limitations in material properties amongst other things.

High rotational speeds are often used, and it is therefore also important that a damping system can withstand fast rotation. This has also proved problematic with apparatuses according to the known art.

SUMMARY OF THE INVENTION

The present invention solves the abovementioned problems by providing a new damping apparatus. The damping apparatus according to the invention is suited to dampen self generated vibrations in boring bars, tool holding bars and the like, preferably rotating machine elements, in particular elements with internal fluid cooling, and the damping apparatus comprises a substantially cylindrically shaped damping body.

The solution is based on a technology where the forces are transferred from the bar to the damping body through resilient elements, where the resilient elements substantially are exposed to shear forces, as opposed to the known art where corresponding resilient elements mainly are exposed to pressure forces. The advantage of transferring the forces as shear forces in stead of pressure forces, is that the spring constant can be lowered and the dampening properties of the material increases when transferring the forces in the shear direction as opposed to transferring the forces in compression.

The G-module, that expresses the stiffness of elastomers exposed to shear forces, is considerably lower than Ec, which expresses the stiffness to elastomers exposed to pressure, and approximately ⅓ of Es that expresses the stiffness of elastomers exposed to tension. In a damping apparatus where the elastic elements/resilient elements (the elastomers) substantially are exposed to shear forces, the spring constant of the system will potentially be reduced, and it is thereby possible to reduce the natural frequency of the damping apparatus considerably without changing the material composition of the elastic element, and without reducing the size or strength of the element. The mass of the damping body does not need to be increased either. Another advantage is increased bandwidth of the damping function, and that the size of the elastic element that for instance is made of rubber, can be increased and thereby result in increased damping, without increasing the natural frequency in relation to existing solutions of the same size. Thereby the damping apparatus can allow for greater variation in the ratio between length and diameter. One advantage of this is the possibility to eliminate damping fluid as a damping medium because increased amount of rubber or other elastic materials is sufficient as the only energy absorbent in the system.

One advantage with the ability to lower the frequency is that the mass of the damping body may be reduced while achieving the same natural frequency as existing systems. This makes the invention more useful in applications where the damping system is to rotate with a high velocity, with considerable centrifugal forces, such as in high velocity milling applications.

The fact that the mass of the damping body may be reduced is useful in that the diameter of a central tube, that may transport cutting fluid to the cutting edge, may be increased. The amount of cutting fluid that can be brought forward can with this solution thereby be increased as compared to present solutions. The advantage with an increased amount of cutting fluid is a more effective removal of chips from the cutting edge.

Another known problem with the solution described in NO patent 172 677, is that the damping fluid in the cavity between the mass and the central tube, can leak past the elastomer used as a resilient element, if this is utilized as a dynamical seal and not is bound to the surrounding parts.

The solution as suggested in the present invention eliminates this problem as the resilient elastomer is directly bound to the surrounding structure, or if alternatively static seals are used.

The damping body of the damping apparatus has an axial boring going there through. The resilient elements, or the elastic elements are provided in each end of the damping element and are connected to a, through the boring axially extending longitudinal central body or tube.

In one application, the apparatus may be provided in a thereto adapted cavity with a substantially axial and cylindrical shape inside a boring bar. The tube may be rigidly connectable to an internal boring for cooling fluid in the boring bar (as the resilient or elastic elastic elements are held in place by means of externally provided washers).

In one embodiment, the present invention allows for supply of cooling fluid to a cutting edge in that the cooling fluid is led straight through the axial area of the damping apparatus when the longitudinal central body is shapes as a tube. This construction allows that the same cavity in the boring bar may include a damping body. The gap between the damping body and the wall of the cavity may be reduced considerably, such that the diameter of the damping body can be increased.

In one embodiment, the outer diameter of the axially extending longitudinal central body is adapted to the diameter of the boring with a small gap for accepting a damping medium, for example a damping fluid such as damping oil.

In one embodiment, the gap for the damping medium may be placed close to the axis of the damping body and the boring bar to reduce the effect of the centrifugal force on the medium to an acceptable level, which has a favourable effect when the damping system must rotate at high speed.

The damping apparatus will now be described with reference to embodiments, and to the enclosed drawings, where

DETAILED DESCRIPTION

Figure 1:
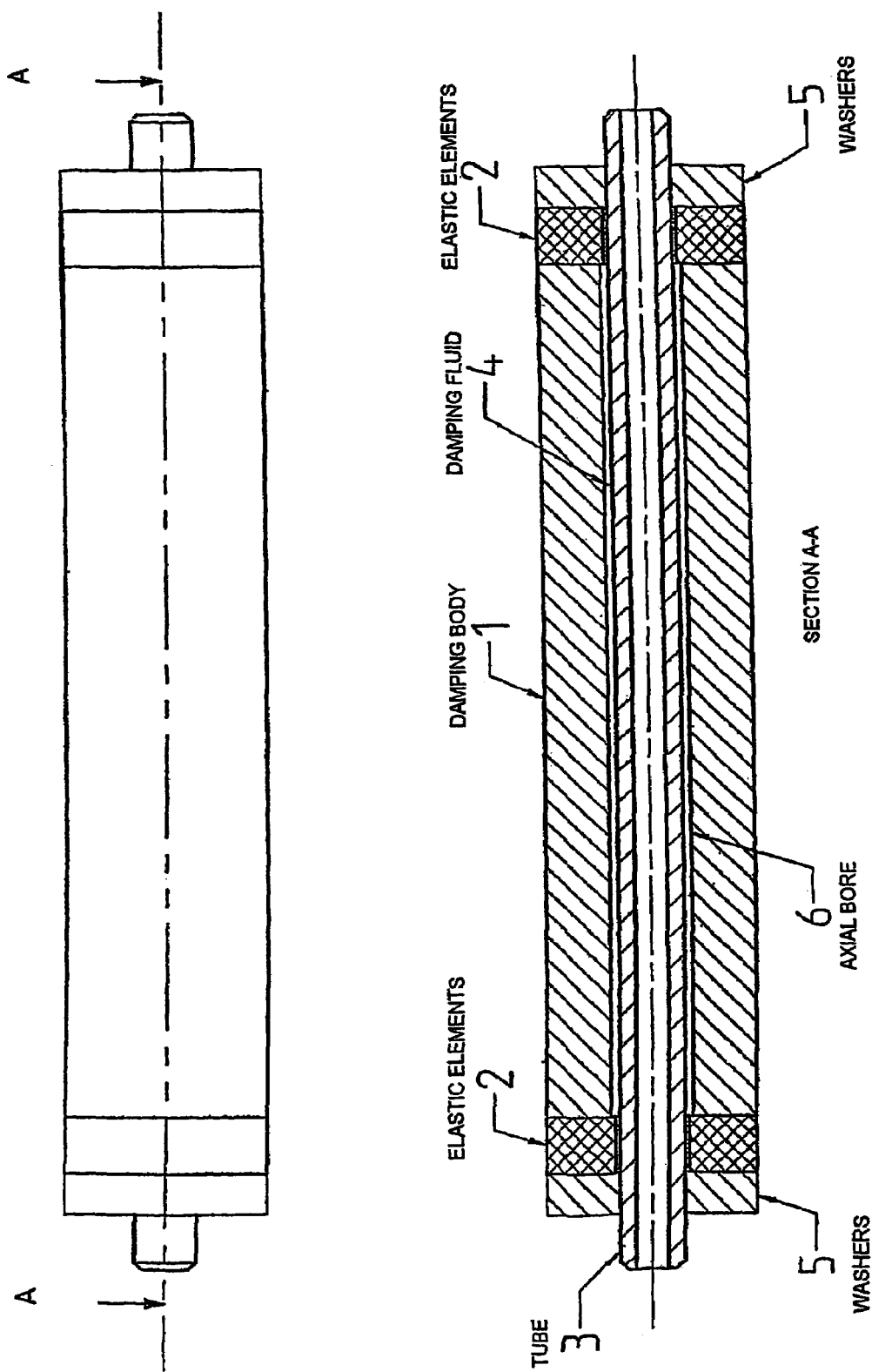
FIG. 1 shows the damping apparatus in its most simple and basic embodiment.

FIG. 1 shows an example of a simple design of a damping apparatus according to the invention. The substantially cylindrical damping body 1 is provided with an axial boring 6 going there trough. Inside the boring, there is an axially extending longitudinal central body or tube 3 that generally is adapted to be rigidly secured at its outer ends inside a boring bar or to the object that is to be damped. The tube 3 is preferably adapted to lead a cooling fluid through itself in communication with a channel extending further into the boring bar. In each outer end of the damping body 1, it is connected elastic elements 2 with a circular shape with for instance a rectangular cross section. The elastic elements 2 can thereby be shaped as elastic washers or short hollow cylinders, with an opening for the passage for the longitudinal central body 3 going there trough and two opposite facing end faces. The end faces will normally be substantially parallel. The elastic elements 2 may for instance be made of rubber or another elastic material. The longitudinal central body 3 is rigidly connected with one of the end faces, and the damping body 1 is rigidly connected with the other end face in that the elastic elements 2 furthermore is connected to washers or end pieces 5 that again is connected to the tube 3 by for instance vulcanization or adhesive bonding. The washers 5 are preferably secured to the tube 3 with a screw connection, but do not necessarily be so. The natural frequency of the system is varied by changing the dimensions or the material properties of the elastic element 2.

Figure 2:
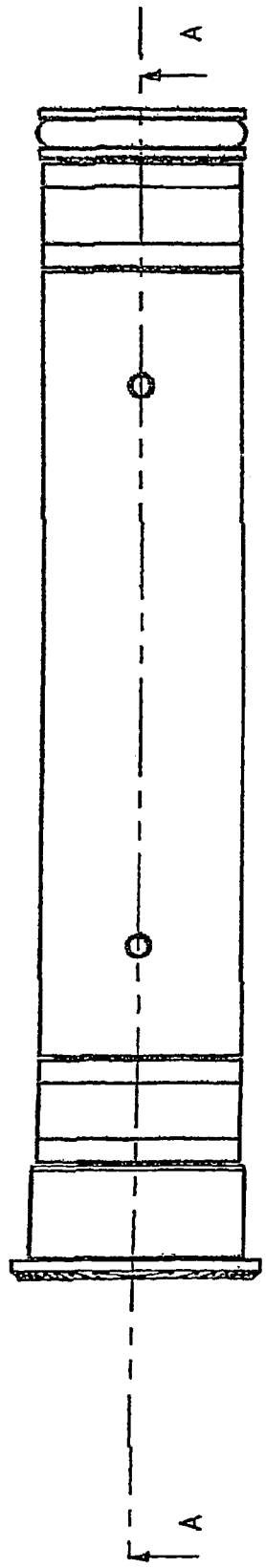
FIG. 2 shows the damping apparatus in a embodiment, where the assembly and installation has been considered.
Figure 2:
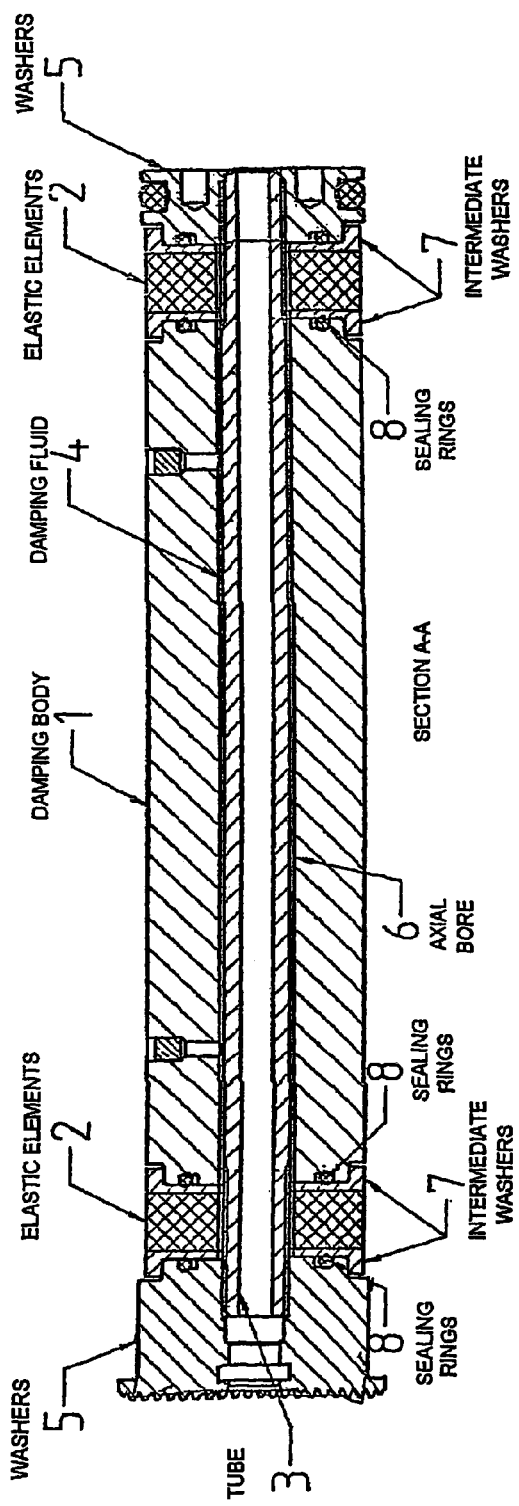

FIG. 2 shows an example where the assembly of the various parts is considered. In this example the elastic elements 2, are connected to intermediate washers 7 on each side.

The connection may be made during the moulding of the elastic elements 2 and is made by applying adhesives on the contact faces of the intermediate washers 7. The intermediate washers 7 facilitate the assembly of the elastic elements 2 to the damping body 1 and the washers 5. The intermediate washers 7 can for instance be secured to these parts with adhesives, and seal against leakage of oil. Alternatively they may be secured with mechanical locking, and with sealing rings 8 in the contact faces to prevent leakage, as shown on FIG. 2. The washers 5 are secured to the tube 3 with a threaded connection, and are in this way rigidly connected to the tube or the longitudinal central body 3. The damping body 1 is placed between these washers 5. Two elastic elements 2 are placed between the two washers 5 and the damping body 1, such that one of the end faces of each elastic element 2 is rigidly connected to the two washers 5. The other end face of each elastic element 2 is rigidly connected to the damping body 1.

Figure 3:
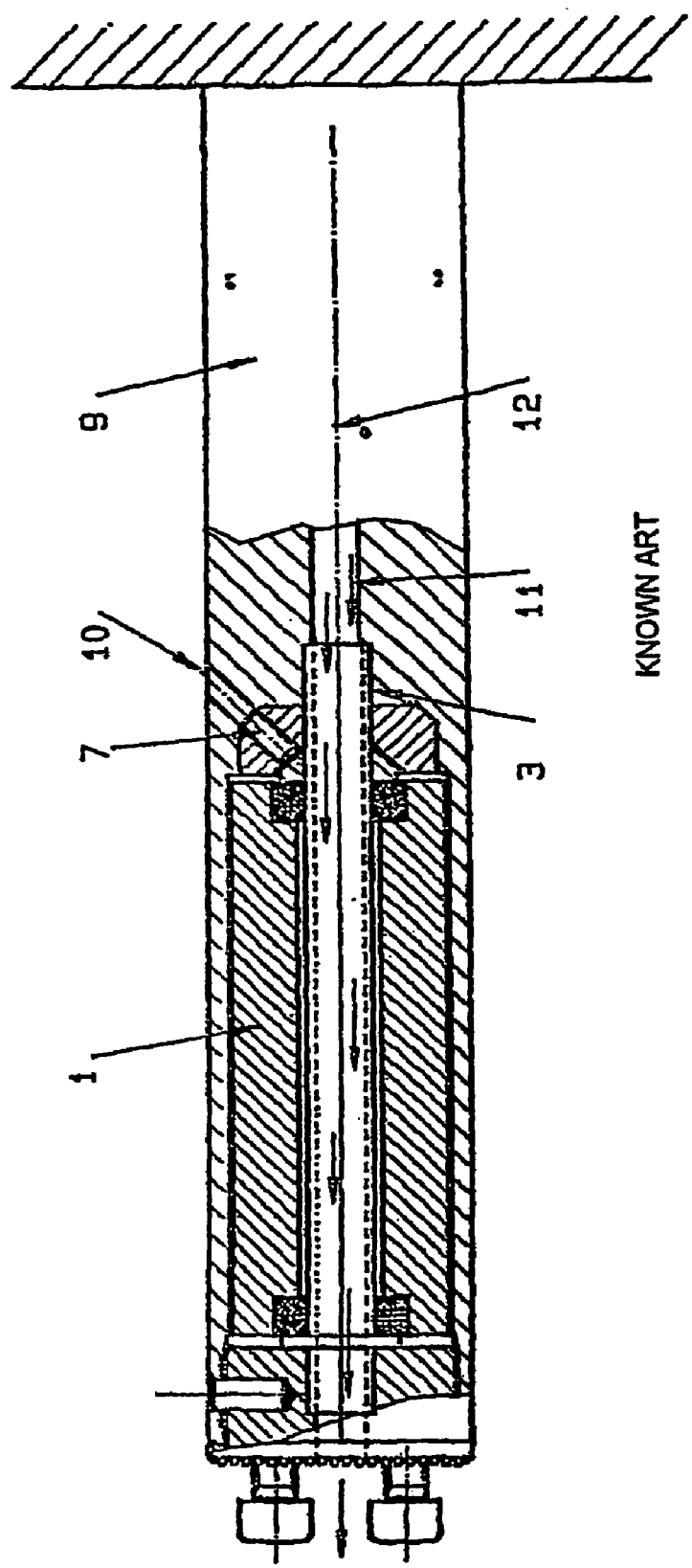
FIG. 3 shows a damper according to the known art build into a boring bar.

On FIG. 3, a damping apparatus according to the known art, build into a boring bar 9, is shown. The boring bar 9 has a cooling duct 11 in direct communication with the central tube 3, and these are aligned with the axis 12 of the boring bar.

Figure 4:
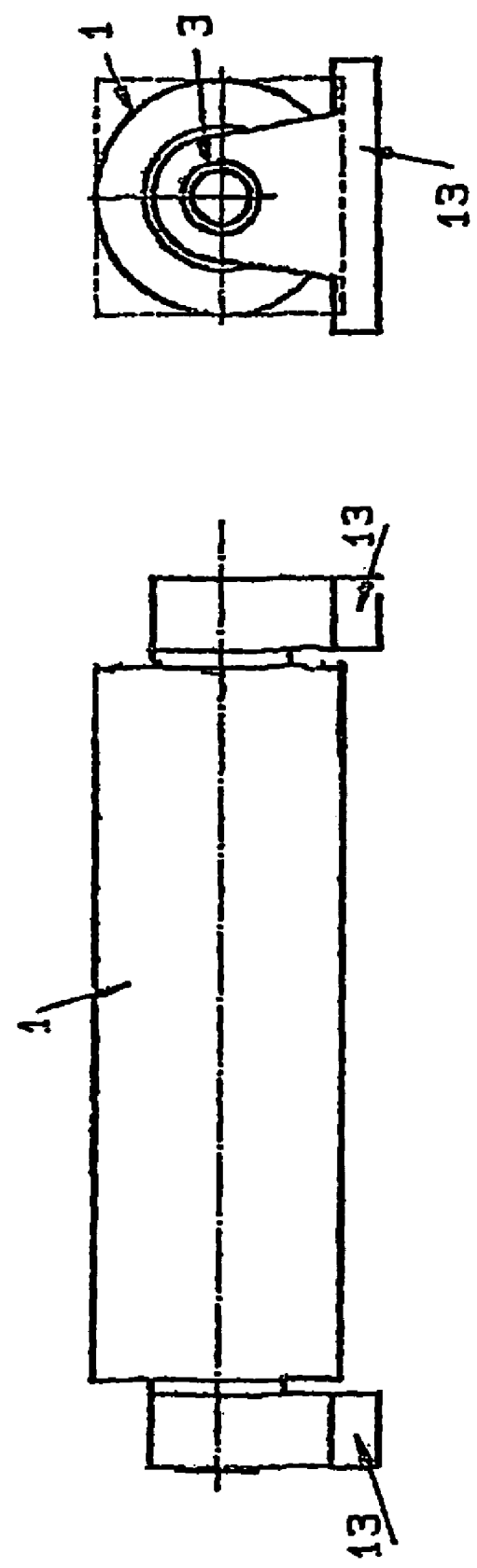
FIG. 4 shows a way of installing of the damping apparatus when this is to be placed on a plane object to be damped.

It is also possible to use the damping apparatus according to the invention to external damping of for instance a plane object, and FIG. 4 shows a mounting bracket for such use. The axially extending longitudinal central body 3 is then fixed to two brackets 13 that again are rigidly secured to the body that is to be damped. The rest of the damping apparatus is of the same embodiment as the one on FIG. 2. In this case, the longitudinal central body does not need to be hollow.

The damping apparatus works generally in the following way:

When the construction that is to be damped, for instance the tool holder, is put into motion due to effects of external forces for instance from a cutting tool, some of this motion is transferred through the elastic elements to the mass of the damping body. Due to the geometry and the connection between the washers and the damping body, the elastic elements Will experience this as shear forces. The motion (energy) that is not transferred from the tool holder through the tube and via the elastic elements to the damping body will be transformed to energy in form of heat in the elastic elements, and in soma cases, the damping fluid. The heat is in this case generated by internal friction in the damping fluid and in the elastic elements, in addition to the various interfaces.

During continuous operation, a typical oscillating motion is occurring and the tool holder and the damping body will substantially move with the same frequency, but phase and acceleration will be slightly different. The difference in phase causes the necessary deformation/friction in the elastic elements and the damping fluid, which gives an energy loss as heat generation. Therefore also the acceleration of the tool holder and the damping body becomes different, and the damping force is in direct relationship to this difference.

The invention claimed is:

1. A damping apparatus for the damping of vibrations, comprising:
    a substantially cylindrical damping body having a bore therethrough and configured to be positioned in a cavity in a boring bar; and
    a longitudinal central body rigidly connectable to the boring bar that is to be damped, the longitudinal central body disposed in the bore and the damping body is connected to the longitudinal central body through two elastic elements with an opening where the longitudinal central body is passing, two washers rigidly connected to the longitudinal central body such that the damping body is placed between these washers, each of the two washers being located at each end of the damping body; the washers and the elastic elements are rigidly secured to the longitudinal central body; wherein each of the two elastic elements comprises two opposing parallel end faces, wherein one of the two opposing end faces is bonded to each of the two washers while the other of the two opposing end faces is bonded to the damping body, wherein the elastic elements transfer vibratory motion from the central body to the damping body substantially by shear force, wherein the elastic elements are made of an elastomeric material and wherein a radially outer peripheral surface of each elastic element is prevented from contacting the damping body.

2. The damping apparatus according to claim 1, wherein the elastic elements are bonded to the washers and the damping body by chemical bonding or vulcanization.

3. The damping apparatus for the damping of vibration according to claim 1, wherein the elastic elements are made as elastic washers or short hollow cylinders.

4. The damping apparatus according to claim 1, wherein a thickness of the elastic elements or distance between end faces is dimensioned to determine the natural frequency of the damping body, and that the natural frequency thereof may be adjusted by changing this thickness.

5. The damping according to claim 1, wherein the longitudinal central body is positioned within the bore such that a small gap for accepting a damping liquid is defined therebetween.

6. The damping apparatus according to claim 1, wherein the cavity is substantially axial and cylindrically shaped inside the boring bar;
that the longitudinal central body consists of a tube, extending axially, and that can lead a cooling fluid, in which tube is rigidly connectable to the inner boring of the boring bar for a cooling fluid.

7. A damping apparatus for the damping of vibrations, comprising:
a substantially cylindrical damping body having a bore therethrough and configured to be positioned in a cavity in a boring bar; and
a longitudinal central body rigidly connectable to the boring bar that is to be damped, the longitudinal central body disposed in the bore and the damping body is connected to the longitudinal central body through two elastic elements with an opening where the longitudinal central body is passing, two washers rigidly connected to the longitudinal central body such that the damping body is placed between these washers, each of the two washers being located at each end of the damping body; the washers and the elastic elements are rigidly secured to the longitudinal central body; wherein the rigid connection of the two washers to the longitudinal central body includes intermediate washers and wherein each of the two elastic elements comprises two opposing parallel end faces, wherein one of the two end faces is bonded to the intermediate washer adjacent each of the two washers and the other end face is bonded to the intermediate washer adjacent the damping body, wherein the elastic elements transfer vibratory motion from the central body to the damping body substantially by shear force, wherein the elastic elements are made of an elastomeric material and wherein a radially outer peripheral surface of each elastic element is prevented from contacting the damping body.

8. A damping apparatus for use in damping vibrations an object, the damping apparatus comprising:
a damping body having a bore therethrough, wherein the damping body includes a first end and a second end;
a tube member connectable to the object to be dampened, wherein the tube is disposed in the bore of the damping body;
a washer disposed proximate each end of the damping body, each washer fixed to the tube member; and
an elastic element disposed adjacent each end of the damping body, each elastic element comprising two opposing parallel end faces and each elastic element has a radially outer peripheral surface that is prevented from contacting the damping body,
wherein:
one opposing end face is adhered to the tube member via the washer,
the other opposing end face is adhered to the damping body,
the elastic elements transfer vibratory motion from the central body to the damping body substantially by shear force, and the elastic elements are made of an elastomeric material.

9. The damping apparatus according to claim 8, wherein each elastic element is adhered to the washer and the damping body by chemical bonding or vulcanization.

10. A method for reducing vibrations of a boring bar, the method comprising:
attaching a damping apparatus to the boring bar, the damping apparatus comprising a damping body, a tube member, at least two washers and at least two elastic elements, wherein each of the two elastic elements comprises two opposing parallel end faces, wherein one of the two end faces is bonded to each of the two washers and the other end face is bonded to the damping body, and the elastic elements are made from an elastomeric material and a radially outer peripheral surface of each elastic element is prevented from contacting the damping body; and
reducing the vibration of the boring bar by utilizing the damping apparatus, wherein the vibration is reduced by transferring the vibration to the damping body via the elastic elements being substantially exposed to shear forces.

11. The method of claim 10, wherein the elastic elements are bonded to the washers and the damping body by a bonding process.

12. The method of claim 10, further including flowing a cooling fluid through the damping apparatus.

13. A method for reducing vibrations of a boring bar, the method comprising:
attaching a damping apparatus to the boring bar, the damping apparatus comprising a damping body, a tube member, at least two washers and at least two elastic elements, wherein the elastic elements are connected to the damping body and the at least two washers through intermediate washers wherein each of the two elastic elements comprises two opposing parallel end faces, wherein one of the two end faces is bonded to the intermediate washer adjacent each of the two washers and the other end face is bonded to the intermediate washer adjacent the damping body, and the elastic elements are made from an elastomeric material and a radially outer peripheral surface of each elastic element is prevented from contacting the damping body; and
reducing the vibration of the boring bar by utilizing the damping apparatus, wherein the vibration is reduced by transferring the vibration to the damping body via the elastic elements being substantially exposed to shear forces.

* * * * *